(12) United States Patent
Kalamkar et al.

(10) Patent No.: US 8,774,845 B1
(45) Date of Patent: *Jul. 8, 2014

(54) GRAPHICAL MOBILE E-MAIL

(75) Inventors: Abhijit Kalamkar, Sunnyvale, CA (US); Elad Gil, Palo Alto, CA (US); Keith J. Coleman, Mountain View, CA (US); Mark Slee, Schaumburg, IL (US); Zhanna Shamis, Burlingame, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/333,131

(22) Filed: Dec. 21, 2011

Related U.S. Application Data (63) Continuation of application No. 11/303,034, filed on Dec. 15, 2005, now Pat. No. 8,086,253.

(51) Int. Cl.
*H04W 4/00* (2009.01)

(52) U.S. Cl.
USPC ........ 455/466; 455/414.1; 455/566; 709/217; 709/231

(58) Field of Classification Search
USPC ......................................... 709/203, 231, 217
See application file for complete search history.

(56) References Cited

U.S. PATENT DOCUMENTS

| | | | |
|---|---|---|---|
| 5,625,670 A | 4/1997 | Campana, Jr. et al. | |
| 5,819,172 A | 10/1998 | Campana, Jr. et al. | |
| 6,067,451 A | 5/2000 | Campana, Jr. et al. | |
| 6,317,592 B1 | 11/2001 | Campana, Jr. et al. | |
| 6,486,891 B1 | 11/2002 | Rice | |
| 6,487,189 B1 | 11/2002 | Eldridge et al. | |
| 6,738,636 B2 | 5/2004 | Lielbriedis | |
| 6,738,800 B1 | 5/2004 | Aquilon et al. | |
| 6,898,422 B2 | 5/2005 | Bern et al. | |
| 6,980,798 B2 | 12/2005 | Kido | |
| 2002/0073034 A1 | 6/2002 | Wagner et al. | |
| 2002/0103881 A1* | 8/2002 | Granade et al. | 709/218 |
| 2003/0093565 A1* | 5/2003 | Berger et al. | 709/246 |
| 2003/0110234 A1 | 6/2003 | Egli et al. | |
| 2003/0149745 A1 | 8/2003 | Dunay et al. | |
| 2003/0152203 A1 | 8/2003 | Berger et al. | |
| 2003/0172121 A1 | 9/2003 | Evans et al. | |
| 2003/0187952 A1* | 10/2003 | Young et al. | 709/219 |
| 2003/0191814 A1 | 10/2003 | Tran | |
| 2003/0204568 A1 | 10/2003 | Bhargava et al. | |
| 2004/0017393 A1 | 1/2004 | Easwar | |
| 2004/0049574 A1 | 3/2004 | Watson et al. | |
| 2005/0096016 A1 | 5/2005 | Tervo et al. | |
| 2005/0289612 A1 | 12/2005 | Morton et al. | |
| 2006/0095506 A1 | 5/2006 | Scott | |
| 2006/0105753 A1 | 5/2006 | Bocking et al. | |

* cited by examiner

*Primary Examiner* — German J Viana Di Prisco
(74) *Attorney, Agent, or Firm* — Fish & Richardson P.C.

(57) ABSTRACT

A method for providing messaging-related information to a mobile device is discussed. The method includes receiving from the mobile device a request for messaging-related information, using the request to identify a device-type indication for the mobile device, identifying one or more presentation parameters for presenting the messaging-related content properly on the mobile device, and transmitting the messaging-related content to the mobile device in a format corresponding to the one or more parameters.

24 Claims, 6 Drawing Sheets

- Root Device
  - Nokia Device
    - Nokia Series 40
    - Nokia Series 60
  - Motorola Device
    - Motorola V Series
      - Motorola V400
      - Motorola V600
        - °
        - °
        - °
    - Motorola Razr

- Root Device
  - 640x480 Full Devices
    - Dell Devices
      - Axim 5000x
      - Axim 5000v
    - Sony Ericsson
      - Sony Blu Ray
    - Motorola
      - Motorola RAZR Wireless
  - 640x480 Limited Devices
    - Dell Devices
      - Axim 5000
    - Sony Ericsson
      - Sony Everyman
    - Motorola
      - Motorola WURFL

- Root Device
  - Nokia Device
    - Nokia Series 40
    - Nokia Series 60
  - Motorola Device
    - Motorola V Series
      - Motorola V400
      - Motorola V600
      - ⋮
    - Motorola Razr

- Root Device
  - 640x480 Full Devices
    - Dell Devices
      - Axim 5000x
      - Axim 5000v
    - Sony Ericsson
      - Sony Blu Ray
    - Motorola
      - Motorola RAZR Wireless
  - 640x480 Limited Devices
    - Dell Devices
      - Axim 5000
    - Sony Ericsson
      - Sony Everyman
    - Motorola
      - Motorola WURFL

GRAPHICAL MOBILE E-MAIL

CLAIM OF PRIORITY

This application is a continuation of U.S. patent application Ser. No. 11/303,034, filed Dec. 15, 2005, the contents of which are hereby incorporated by reference.

TECHNICAL FIELD

This application relates to the display of electronic messages such as e-mail on mobile devices or other devices having constrained displays.

BACKGROUND

People today expect to have greater access to data than ever before. They want to retrieve their data on the road, in the home, or in the office, something they could only do before from a permanently connected personal computer hooked to an appropriately provisioned network. Some have also formed an obsession with having a continuous connection to communication tools, such as in the form of text-messaging or e-mail. For example, many people have adopted mobile e-mail solutions like the BlackBerry devices from Research in Motion or other similar devices.

Such systems, however, may have a number of limitations. For example, mobile devices do not have the same display capabilities as do desktop computers, so messaging that involves "rich" content such as complex graphics, videos, and Flash animations may not display on mobile devices. Generally, graphical content for mobile devices is produced using the Extensible Hypertext Markup Language (XHTML) format or the Wireless Markup Language (WML) rather than the HTML format used for desktop-directed content. However, a sender of a message may not know whether the receiver plans to view the content on a desktop or a mobile system.

Even apart from displaying the content, many desktop-based messaging systems have numerous icons and menus that are displayed around the content. The small displays on mobile devices may be too small to display such features, or the features may be shrunk too small to see, if they are included on mobile displays.

In addition, mobile messaging solutions are often proprietary, so that all users must use a device or devices provided by the operator of the messaging service (or the operator's close partner). Proprietary systems are beneficial because they allow the operator to know (and limit) the capabilities of the devices in the system, and to thereby better control the content in the system. However, such an approach limits a user's flexibility in selecting a device, and also limits the ability of a user to configure the device in a manner that best serves the user. Flexibility in choice of device presents complications, however, because the presentation capabilities of mobile devices can vary widely, so that content suitable for one device may not be suitable for another device. As a result, there is a need for systems and methods that can provide messaging content to mobile devices in a flexible manner that fits the needs of users, while limiting the burden on the user to select a particular device or continually update the manner in which content is presented.

SUMMARY

This document discusses various implementations of systems and methods for delivering messaging content to mobile devices. In general, when a request for content, such as e-mails, is received from a mobile device, the device type is determined, such as by the user agent string sent with the request. The capabilities of the device may then be determined and the messaging content delivered in a manner that may be handled by the capabilities of the device.

In one implementation, a method for providing messaging-related information to a mobile device is described. The method comprises receiving from the mobile device a request for messaging-related information, using the request to identify a device-type indication for the mobile device, identifying one or more presentation parameters for presenting the messaging-related content properly on the mobile device, and transmitting the messaging-related content to the mobile device in a format corresponding to the one or more parameters. The request from the mobile device may be received in an HTTP format, and the messaging-related content may be transmitted to the mobile device in an XHTML or WML format. Also, the request may include a user agent string that is used to identify the device-type indication, and the device-type indication may be identified by performing a look-up on user agent string. The device-type indication may also be identified by a complete match, or by a partial match and the application of heuristic selection rules.

In some embodiments, the one or more presentation parameters may include a device display width, or a voice-generator parameter. The messaging-related content may also be transmitted as a plurality of electronic mail messages, and the transmitted mail messages may comprise the size of message snippets to be displayed by the mobile device. The one or more presentation parameters may also be determined by mapping the device-type indication to a hierarchical organization of device types. In addition, promotional content may be transmitted with the messaging-related content to the mobile device in a format corresponding to the one or more parameters.

In yet another implementation, a system for delivering messaging-related content is described. The system comprises a first server to receive requests for messaging-related information from a mobile device, means for identifying one or more to display capabilities of the mobile device, and a second server to transmit messaging-related information to the mobile device in a format corresponding to the presentation capabilities of the mobile device. The request may comprise a user agent string. The first server may be the same server as the second server.

In another embodiment, a system for delivering messaging-related content is disclosed. The system comprises a web server to receive requests for messaging-related information from a mobile device, a device classifier that receives device information from the web server and corresponds it to presentation capabilities of the mobile device, and an interface to transmit messaging-related information to the mobile device in a format corresponding to the presentation capabilities. The device classifier may comprise a look-up table correlating data relating to user agent strings to data relating to one or more devices. Also, the messaging-related information may be transmitted in the form of a mark-up language. The system may also further comprise an advertising server in communication with the interface to provide promotional content relating to the requests for transmission by the interface.

In yet another implementation, a computer program product is disclosed. The product is tangibly embodied in an information carrier and comprises instructions operable to cause data processing apparatus to receive from the mobile device a request for messaging-related information, use the request to identify a device-type indication for the mobile device, identify one or more presentation parameters for presenting the messaging-related content properly on the mobile device, and transmit the messaging-related content to the mobile device in a format corresponding to the one or more parameters. The messaging-related content may be transmitted to the mobile device as part of a mark-up language transmission, and may also be transmitted as a plurality of electronic mail messages.

Various implementations may provide certain advantages. For example, a messaging management system may allow a user to obtain messaging content using multiple devices, and have the content delivered in a manner that is right for each device. Such an approach may, in appropriate circumstances, be provided even though the user accesses the system in similar manners (e.g., using web browsers) from the various devices. In addition, various interfaces for the messaging system may also be provided to depending on the type of device the user has been identified as using at the moment. In this manner, messaging services need not be tied to a particular device and users may benefit more readily from using a messaging system, regardless of where they are and the device they are using.

The details of one or more implementations are set forth in the drawings and the description below. Other features, objects, and advantages will be apparent from the description and drawings, and from the claims.

DETAILED DESCRIPTION

Figure 1:
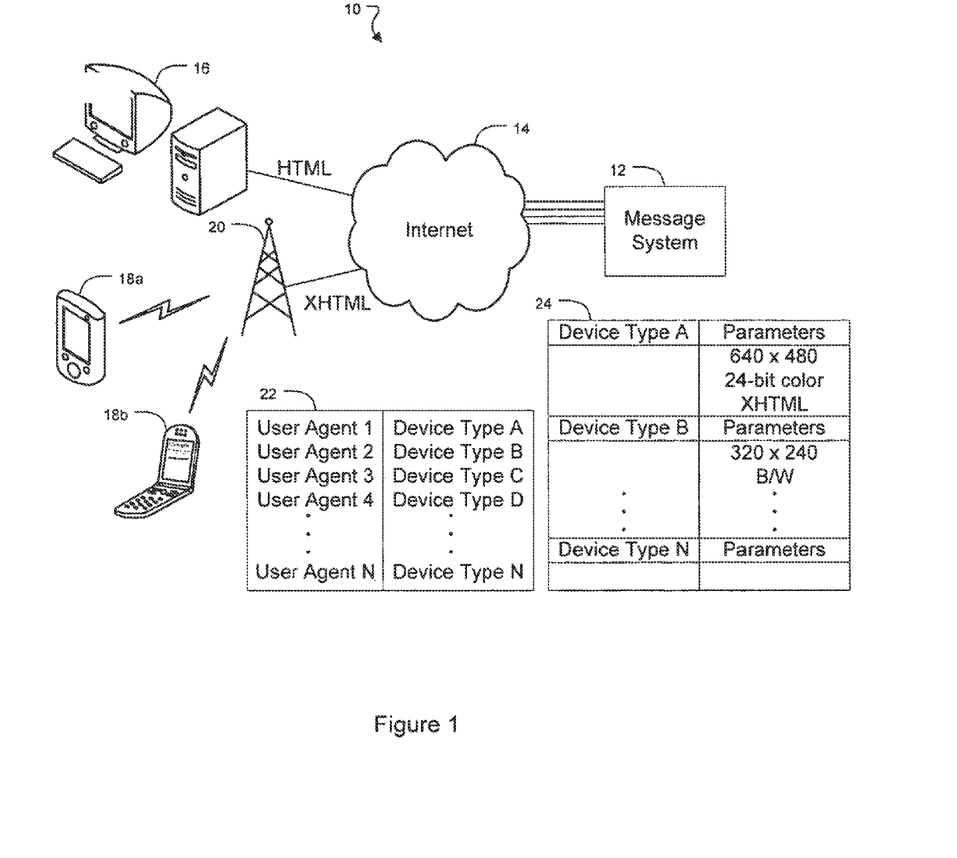
FIG. 1 is a conceptual diagram showing components of a messaging management system.

FIG. 1 is a conceptual diagram showing components of a messaging management system 10. In general, the system 10 provides for formatting and delivery of documents in a manner best suited for delivery to users of various devices. Such formatting may include limiting the type of, or size of, graphical material that is delivered, or limiting delivery to audible rather than graphical content. In general, the system 10 determines the capabilities of the device the user is currently using to obtain the information, and formats the information accordingly for that device. This approach may be used even where the device is using a web browser to access the information, where applications providing information to a web browser typically do not concern themselves with the abilities of the device, but instead leave formatting of the information to the web browser.

System 10 includes a message system 12, and user devices such as a desktop computer 16 and mobile devices 18a, 18b connected to the internet 14. Message system 12 may be, for example, a system for collecting and delivering electronic e-mails, such as the Google Gmail system. Message system 12 may also be an instant messaging system, a text-messaging system, or a combination of such systems. In addition, message system 12 may also or alternatively provide other information, such as by serving as a search engine for responding to user requests with search results.

The message system 12 may be designed so that it delivers messaging content according to the presentation capabilities of the requesting device. For example, where the device is desktop computer 16 seeking information through a typical HTTP request, the message system 12 may deliver the content in HTML format for display on an internet web browser. The system 12 may also deliver related icons and other user interface items such as control buttons and navigational tools.

Where the requesting device is mobile device 18a or 18b, such as a cellular telephone, a smart phone, a PDA, or a similar wireless device, communicating through wireless network access point 20 (e.g., cellular telephone tower or WiFi or WiMAX access point), the message system 22 may deliver the content in XHTML format or other format appropriate for mobile devices. Such format may be selected because it is generally supported by mobile devices having limited, display and computational capabilities. Other formats suitable for display on devices having limited presentation abilities may also be used, such as WML and iMode. In addition, where the device is one which communicates through synthesized speech rather than, or in addition to, visual display, the format of the transmitted information may be selected accordingly.

The message system 12 may select the format for transmitting content by learning the type of device from which a request. As shown in FIG. 1, for example, mobile device 18a may be a PDA having relatively substantial display capabilities, such as a color 640×480 resolution graphical display. In contrast, mobile device 18b may be a cellular telephone with a much smaller screen and much more limited processing and graphics capabilities. System 12 may look at various pieces of information to make a determination about the presentation capabilities of each respective device, and may be configured to do so even if a common user having a single user identification with the system uses different devices at different times. The system may also be configured to save certain presentation parameters for a particular user, and apply those parameters unless there is an indication that the user has changed devices.

The request for messaging content may be made in real-time, e.g., as part of an WWW transaction, in which the user selects a web page icon to obtain information, and the messaging system 12 immediately gathers and delivers the content. The request may also be asynchronous. For example, a user may initially set up an account or otherwise indicate a preference to receive information from messaging system 22. The user could, for example, use a desktop computer to establish parameters for an account (e.g., by setting up a standard Gmail account in a well known manner). The user may then associate the account with one or more mobile devices. For example, the user may provide an identification number, such as a telephone number, for a mobile device using a web browser (e.g., on a desktop computer or on the wireless device itself). The identification number may be provided either explicitly, e.g., by providing it in a box on a web page, or implicitly, e.g., by contacting a system with a wireless device and having the system determine the identification information from messages sent by the device.

Where the provision of device information is asynchronous, the user may later obtain messaging information from system 12 in various manners. It may, for example, seek information directly, as in the synchronous example. The system 12 may also periodically transmit the information, such as at predetermined periods or whenever a new message arrives. A user may also establish parameters for an account so that only certain messages are pushed out to a mobile device, e.g., messages of a certain size or messages from a certain domain or domains.

The messaging system 12 may determine the presentation capabilities of a device by first determining the type of device and then placing the device into a category for which presentation capabilities are defined. For example, devices generally transmit, with an HTTP request, a header containing a user agent string that identifies the client application, and thereby may identify the requesting device. Exemplary user agent strings include the following:

PlayStation Portable: 2.00—Mozilla/4.0 (PSP (PlayStation Portable); 2.00)

Pocket Internet Explorer On Windows Mobile 2003—Mozilla/4.0 (compatible; MSIE 4.01; Windows CE; PPC; 240×320)

Internet Explorer 7.0 beta running on Windows Vista—Mozilla/4.0 (compatible; is MSIE 7.0b; Windows NT 6.0)

Table 22 stored at messaging system 12 provides a correspondence between information in a user agent string and a particular device or device type. For example, the device type may be a particular model of mobile device made by a particular manufacturer, such as a Moto RAZR cellular telephone. Table 24 at message system 12 may also correspond a device or device type to certain presentation capabilities. These capabilities may include for example a dimension of, or the dimensions (X and Y) of a video display. It may alternatively, or in addition, include information about whether the device can display color, and the level of color that can be displayed. It may also include information about whether the device can display certain "rich" content such as video or Flash animations, or the type of input mechanism on a device.

Table 22 and table 24 are provided for illustrative purposes. They may also take other forms, and may be replaced with additional tables or combined into a single table. Also, the information in each table may be altered as appropriate to permit system 12 to use incoming information about a device to determine the presentation capabilities of the device. In addition, various device indicators other than a user agent string may be analyzed to determine a device's capabilities, as discussed in more detail below.

Once a determination of an appropriate device parameter or parameters for a device is made, the system 12 may format any future content to be delivered to a device accordingly. Such formatting may take a variety of forms. For example, the parameters may affect the number of messaging threads to be displayed on each page or page transmission. They may also affect the size of snippets (e.g., the title of an e-mail and perhaps certain text within the e-mail) to be sent for display on the device, and the level of truncation of text that is sent to the device. In addition, they may also affect the type of messages to be sent to the device. For example, messages containing extensive HTML content (e.g., commercial messages rather than simple person-to-person e-mails) may be filtered from being sent to certain devices. Moreover, they may affect only content that may be immediately displayed by the device is sent (e.g., in a static web page) or whether full messages should be sent so that a device can either display the full messages, or display snippets but store the full messages for quicker display if a user selects one or more of the messages for full display.

A user may obtain one or more benefits from such a system. For example, the user may obtain messaging information from their home computer or their cellular telephone or wireless PDA, and may have the information formatted properly for each device by the system 12 determining which device they are using, and without the user having to provide additional formatting information. Such an approach may free a user from selecting particular proprietary devices, and may allow a user to switch easily from one device to another in obtaining messaging information.

The techniques and features just discussed in concept may be implemented in any appropriate environment where proper display of documents such as electronic mail messages is a concern, including in the systems and methods discussed below.

Figure 2:
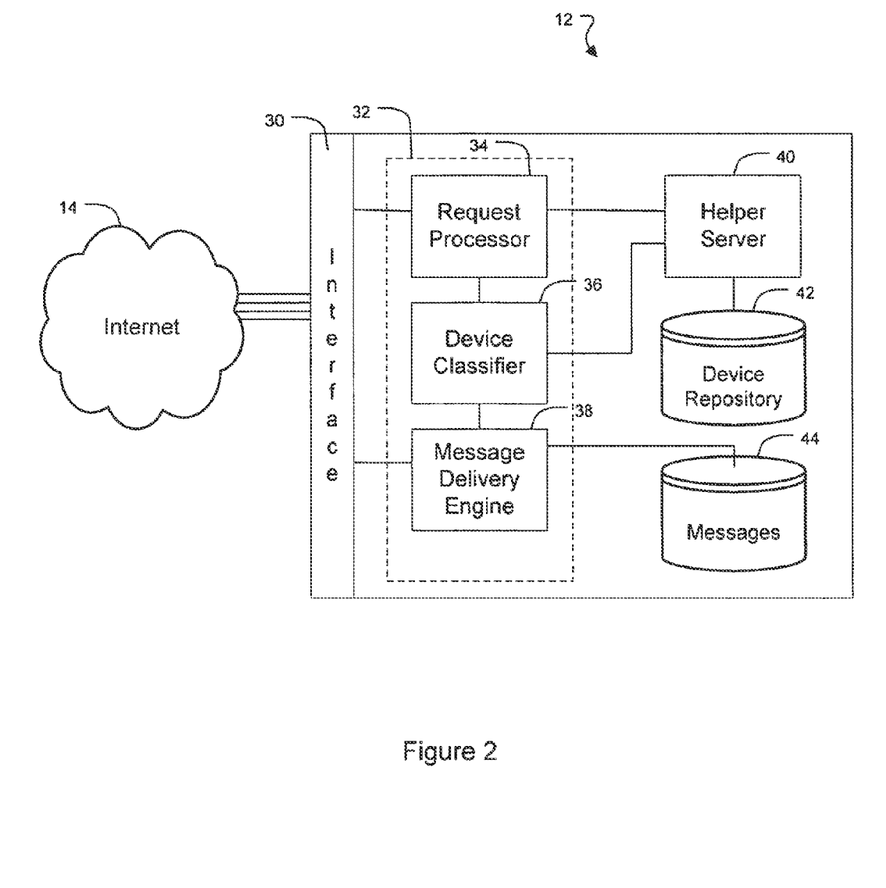
FIG. 2 is a block diagram of a system that may be used to deliver electronic content such as electronic mail.

FIG. 2 is a block diagram of a system 12 that may be used to deliver electronic content such as electronic mail. In general, system 12 may be the same as message system 12 in FIG. 1. The system 12 may connect in any appropriate manner through, an interface 30 to the interne 14. Interface 30 may be, for example, a web server (or group of web servers) of appropriate configuration. Interface 30 may process incoming requests to determine, for example, which of multiple available subsystems within system 12 are appropriate for responding to a request. The components of system 12 may communicate with each other over an appropriately provisioned network. The network may comprise a LAN (local area network) or a WAN (wide area network), such as the Internet.

In this exemplary embodiment, the pictured subsystem is an electronic mail system centered around a front-end 32. This front-end 32 is responsible for receiving messaging requests from user devices and preparing messages and other content for transmission to the devices. Front-end 32 may be configured to apply a particular user interface to the system 12 for users of, for example, web-based e-mail applications or similar e-mail applications. As such, front-end 32 may obtain particular e-mail content for a user and merge it with appropriate user interface content for transmission to a remote device, such as in the form of an HTML, XHTML, iMode, WML, or other transmission: Front-end 32 may itself be a web server or part of a web server, and may be part of interface 30.

Front-end 32 includes a request processor 34, which obtains information from interface 30, generally in the form of requests from users for information. Such a request may include a request to receive recent e-mail messages or to update a display of such messages (e.g., by removing a recently deleted message from a display and adding new messages). In general, the requests to be processed by request processor 34 may be of a typical type for an electronic mail program or other similar program. Where the subsystem is something other than a messaging system, such as a search engine, the request processor may receive search requests. The request may take any appropriate form, such as an appropriately formatted HTTP request.

Request processor 34 may be established or otherwise configured to parse incoming requests, such as to separate header information from other data in a request. As one example, request processor 34 may parse a user agent string from a request. Request processor 34 may also parse other information, such as header information inserted by proxies through which a request is sent. For example, certain wireless communications networks may insert information that allows those networks to be identified. This information too may be used to identify the presentation capabilities of a device, as discussed more fully below.

A helper server 40 may be called by the front-end 34, such as by an appropriate remote procedure call (RPC). The helper server 40 may be a C++ server that provides a variety of services to system 12, such as spellchecking, encoding detection, and other miscellaneous functions variously required by system 12. Helper server 40 may also be a variety of servers, or may be incorporated with front-end 32 as appropriate. As discussed herein, devices denoted as servers may be an appropriately provisioned and configured computer or group of computers for providing responses to requests. Particular servers are identified in an exemplary manner only, and various actions may be performed by other computers, by multiple computers, or by a single computer as appropriate.

In this example, helper server 40 has access to a device repository 42, which stores information regarding device-type indications. For example, device repository 42 may associate a particular user agent string with a particular device or class of devices, which may be represented by a name or identifying number for the device or class of devices. As one example, helper server may associated the user agent string of "Mozilla/4.0 (PSP (PlayStation Portable); 2.00)" with the PlayStation Portable gaming device. Other strings may be associated with certain wireless communication devices.

Helper server 40 may also retrieve other information regarding a request from a remote device, such as a mobile device. For example, helper server 40 may be capable of using received header information to determine the carrier for a request, such as a particular cellular telephone carrier. From this information, certain inferences about a device may be made, either by helper server 40, or by front-end 32. For example, if the carrier is ACME Telco Co., it might be known that that particular carrier only supports Motorola handsets. Thus, if the user agent string suggests that the mobile device making a request is something other than a Motorola device, the information from the user agent string might be overridden or re-checked.

Device classifier 36 receives information about a device, such as from request processor 34 or helper server 40, and makes a determination about the device's presentation capabilities. Device classifier 36 may take as inputs a number of different parameters that may be indicative of a device's capabilities. As discussed above, these inputs may include a device-type indicator derived from a user agent string, or information about types of devices supported by a particular network. In addition, information about the input mechanism on a device (e.g., Qwerty keyboard or 9-key keypad) or other parameters may also be considered.

Some parameters may be known to provide a more complete or accurate indication of a devices capabilities than may others. Also, some indicators may simply be inaccurate. Device classifier 36 may be provided with heuristic rules for evaluating each indicator and giving it an appropriate effect in determining the capabilities of a device. For example, rules may be established to select a "winner" when two different parameters provide conflicting indications of a device's presentation capabilities. The "winner" may be, for example, the characteristic that has been found in the past to be a more accurate predictor or a device's capabilities. Such determinations may be predetermined and coded into the system. Also, the determinations may be made automatically, such as by machine learning, after providing the system with a set of training data.

Also, various parameters may be provided with particular weights so as to create a score or scores for an incoming request. One score may reflect indications that the request comes from a first device, while another score may reflect indications that the request comes from a different device. The device that is inferred to be the requesting device may be the device with the highest total score.

The device classifier 36 may infer a device that sent a request, and may then determine a presentation parameter for the device. In doing so, the device classifier 36 may generalize a particular device into a group in which the device resides, but which share common presentation capabilities. For example, the device classifier 36 may determine that a requesting device is a Samsung Model X-2000 smartphone. The device classifier 36 may then determine that the X-2000 is part of a family of devices having a particular presentation capability (e.g., a 320×240 color screen, with no ability to display animations). The device classifier may then assign the device the capabilities of that family.

Figure 3:
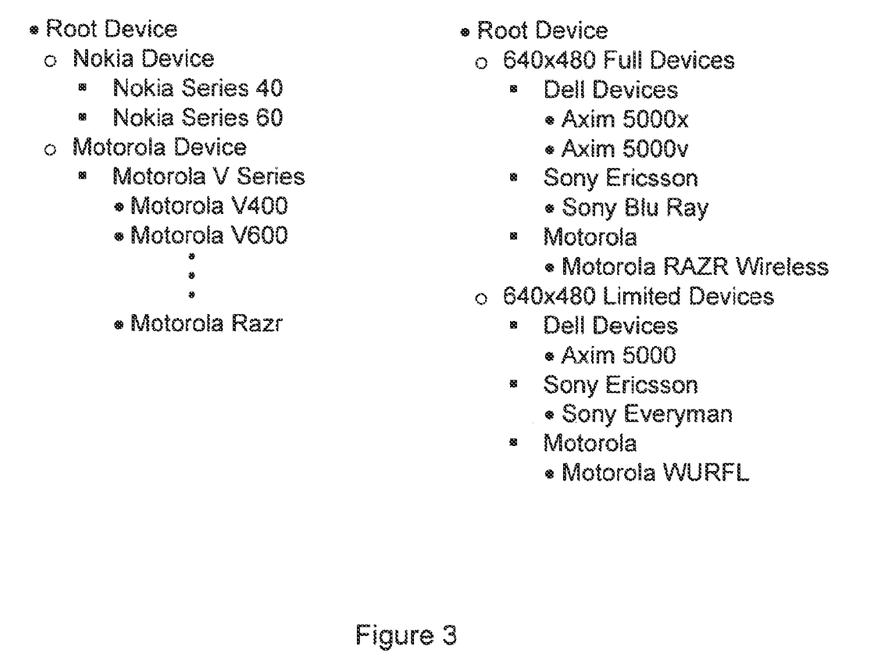
FIG. 3 shows a hierarchical arrangement of mobile device classifications.

FIG. 3 shows, for example, a hierarchical arrangement of device classifications. Two separate approaches to classifying devices are shown. In one example, devices are organized by manufacturer and by families within each manufacturer. At appropriate levels or nodes in the structure, presentation capabilities may be provided. For example, all Motorola V Series cellular telephones may have a common capability. In such a situation, system 12 may first determine that a particular model of V Series telephone is a requester, and may then traverse back up the hierarchical tree until a presentation parameter (e.g., 320×240 display) is reached. That parameter may then be assigned to the requesting device.

On the right, another arrangement is shown. There, devices of all manufacturers are arranged under an appropriate presentation capability. In the example, there are two capabilities: 640×480 Full, and 640×480 Limited. Both capabilities represent 640×480 pixel displays. The former represents devices that are capable of displaying all sorts of rich content, including complex graphics and animations. The latter represents devices that have a 640×480 display, but whose processing systems are limited from displaying complex content such as animations. Again, a particular device or class of devices may be identified, and the hierarchical tree traversed upwardly until a presentation capability is located for the device.

Referring again to FIG. 2, device classifier 36 passes its determination of device capabilities to message delivery engine 38, which may comprise an appropriately provisioned computer server that obtains messaging content from messages storage 44, and deliver the content so as to be displayed by a device having the capabilities. Message delivery engine may, for example, produce an HTML, XHTML, or other mark-up document or documents that include an e-mail user interface having appropriate icons and control features, along with a plurality of e-mail messages.

In short, system 12 is capable of using one or more clues about the identity of a requesting device to determine the presentation capabilities of the device. System 12 may then assemble messaging information in a format, such as in a web page displaying an e-mail application, appropriate for such capabilities.

Figure 4:
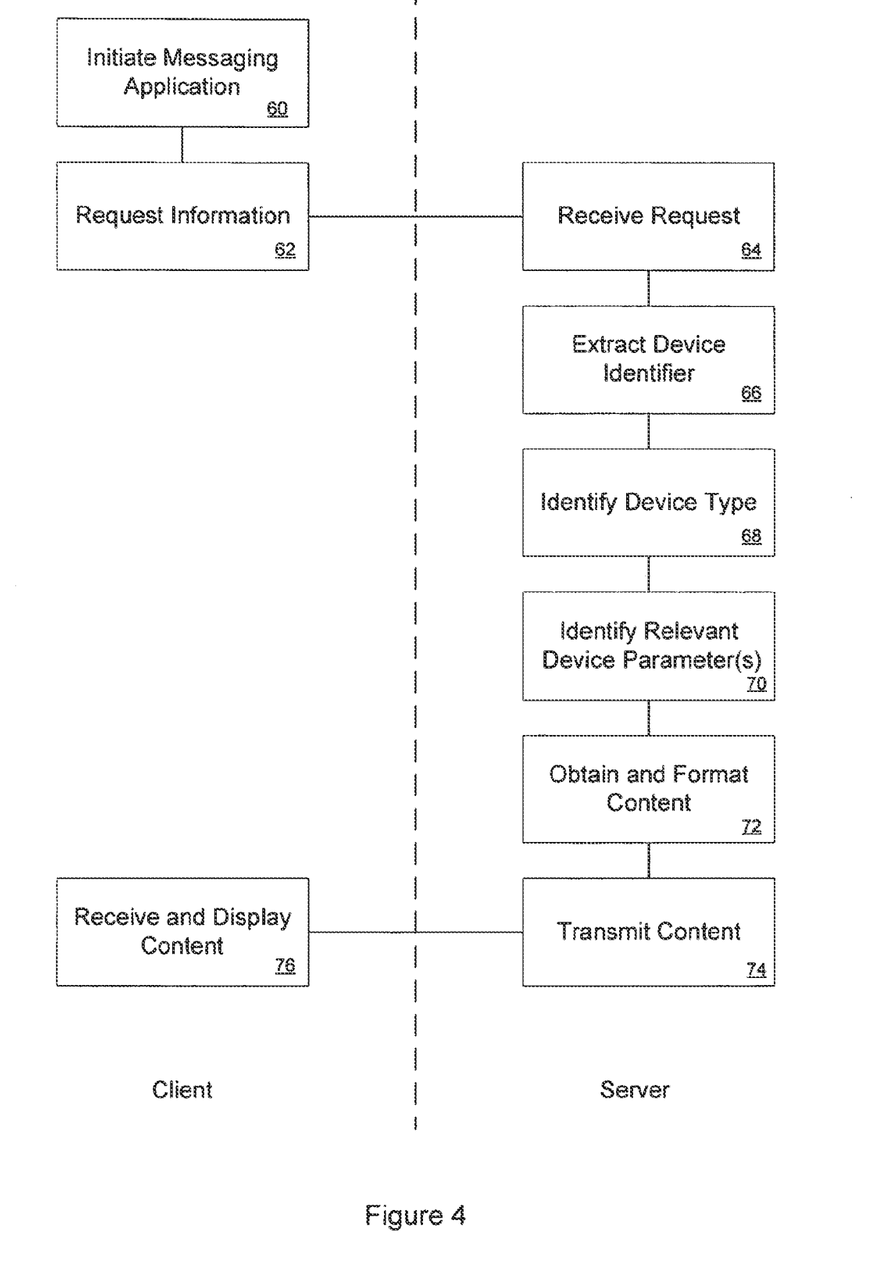
FIG. 4 is a flow diagram of a method for obtaining and delivering electronic content such as electronic mail in a manner directed to a type of user device.

FIG. 4 is a flow diagram of a method for obtaining and delivering electronic content such as electronic mail, in a manner directed to a type of user device. The diagram is shown as a swim-lane diagram that depicts for illustrative purposes the performance of certain acts by a client and others by a server. This depiction is intended to assist in understanding the process, but is not intended to suggest the requirement for a particular client-server architecture, or to require that certain acts be performed by one computer, as opposed to a different computer or a group of computers.

A client at first initiates a messaging application (act 60). The initiation may generally involve the launch of a messaging application, such as an e-mail application. Such launch may occur automatically when a device is turned on. The initiation may occur in near real-time, so that initiation occurs slightly before any request for messages, or may occur well before a request for messages, such as when a user establishes an account. The initiation may also occur upon the launching of a web browser and the pointing of the browser to an e-mail service.

At act 62, the client device requests messaging information from a messaging service, such as the Gmail e-mail service. The request may take the form, for example, of an HTTP request directed over the Internet. The request may be a request for a real-time update of messaging information, or may be a request in the form of steps taken to set up a messaging account. In such a situation, messaging information may later be pushed out to the client without the need for a real-time request.

The server may receive the request at act 64, and may extract one or more device identifiers from the request at act 66. Such device identifiers may include a user agent string in the device, and other header information, as discussed above. The extraction may also involve obtaining an identifier for the particular device, such as a cookie or similar object, rather than an identifier for a device type that is not dependent on the identity of the particular device. The server may then identify the device type (act 68), such as a model number and manufacturer for a device, or an identifier for a group of devices.

With the device type identified, the server may then identify one or more relevant parameters that define the presentation capabilities of the device (act 70). Such a determination may occur through a simple look up function or by other appropriate mechanisms.

With presentation parameters for the device determined, the server may then obtain messaging content for the device, and may format that content to match one or more of the parameters (act 72). For example, where snippets of information are to be provided, the size or length of the snippets may be changed to better match the screen resolution of a device. Also, images may be re-rendered to be smaller so as to fit on a smaller display. Also, where the device provides for audio presentation, textual messages may be converted to audio files. In addition, the server may provide content in addition to the messaging content. For example, controls for an e-mail application may be provided. In such a situation, the server may change the controls that are provided (e.g., providing greater or fewer controls) or may change the manner in which the controls are displayed based on the device parameters (e.g., by displaying different icon graphics).

Additional content may also be provided. For example, promotional information such as advertisements may be collected (e.g., by providing text from e-mail messages to an advertising server) and transmitted along with any messages. The advertisements may be stored in multiple formats, such as basic text formats, text-plus-graphic formats, and full animated graphics formats. Each format may be associated with a particular parameter or parameters. Based on the parameters determined for a particular device, the system may obtain the appropriate format of advertisement to be sent to the device. For example, an e-mail server may send a request, such as in an RPC, to an advertising server and may include a presentation parameter or another parameter that reflects a presentation parameter. The advertising server may use this information, and potentially other information that is passed (such as keywords relating to text in the e-mails) to select particular advertisements in an appropriate format. The advertising server may then pass the advertisements on to the e-mail server, which may in turn incorporate them into a transmission, such as an HTML or XHTML transmission.

Figure 5:
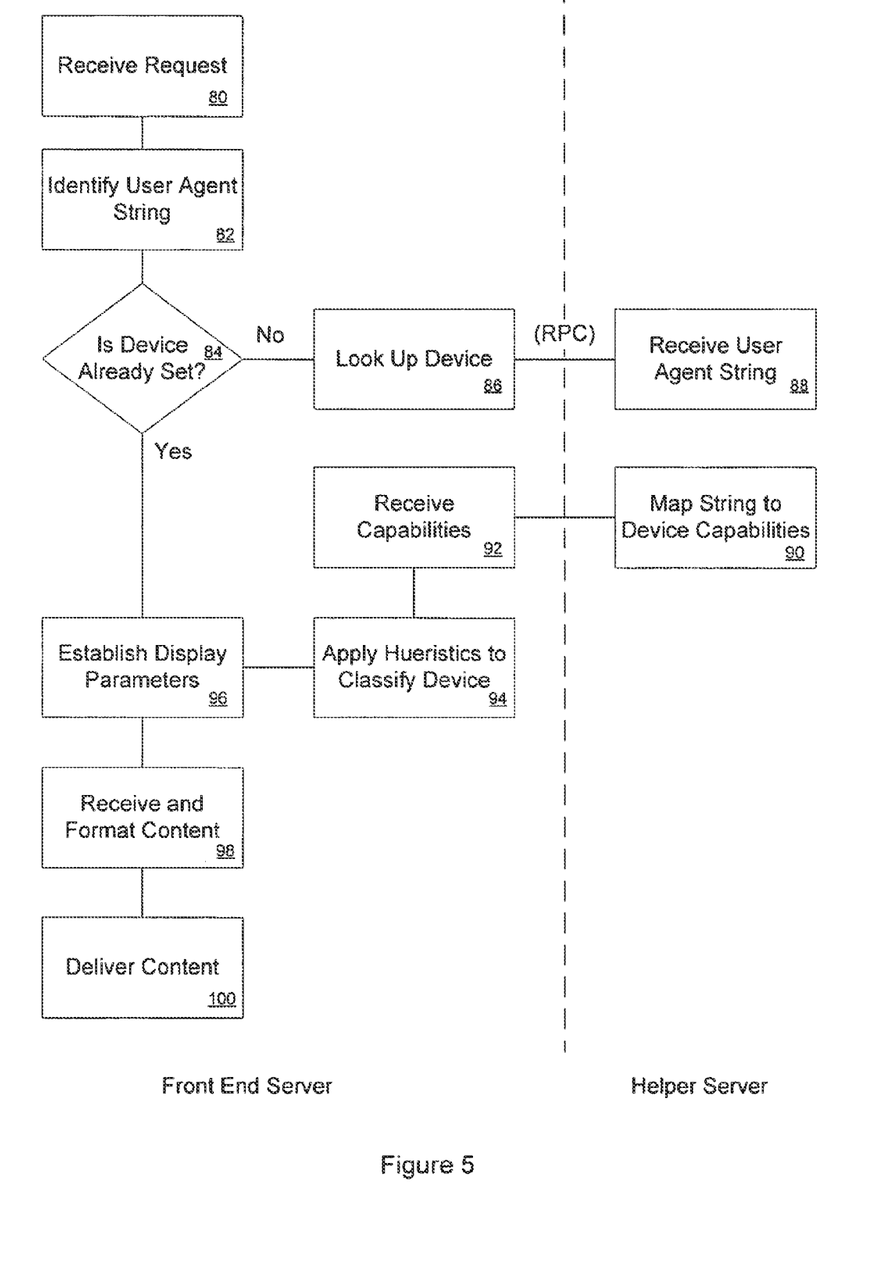
FIG. 5 is a flow diagram of a method of formatting and delivering electronic content such as electronic mail.

FIG. 5 is a flow diagram of a method of formatting and delivering electronic content such as electronic mail. This diagram shows operations similar to those in FIG. 4, but focuses more closely on the actions performed by the server system. Although any appropriate configuration of servers may be used, two servers—a front-end server and a helper server—corresponding to the servers in FIG. 2, are shown here for illustrative purposes.

The front-end server initially receives a request for messaging information (act 80). This request may come directly from a remote device or may also come from the e-mail system itself, such as when one or more incoming e-mails have arrived and need to be pushed out to a remote device. The server may then parse the received request to identify certain information such as a user agent string, as discussed above (act 82). If the front-end server determines (e.g., by looking at a cookie, an e-mail ID and password, or other identifying information) that the device sending the request has already been encountered and one or more presentation parameters for the device determined (act 84), the front-end server may immediately establish those display parameters for the device (act 96).

If, in contrast, information about the device has not already been determined (act 84), the front-end server may send an RPC request to the helper server (act 86) to get it to look up the device. The helper server may them receive the user agent string or other indicator from the front-end server (act 88) and use that indicator (or indicators) to determine certain capabilities for the device or simply to identify the likely device, as explained above (act 90). The helper server may then pass the retrieved information back to the front-end server (act 92). The information passed may be actual capabilities of the device, or other indications that relate to one or more pieces of information associated with the request.

If the helper server does not pass actual presentation capabilities, such capabilities may be determined or inferred from the information passed by the helper server. And again, any actions by the helper server may be performed by the front-end server, or various actions may be performed by other devices. The determination of presentation capabilities may be determined by the application of heuristics to the various attributes about the device that are known (act 94). For example, where an exact and confident match is made to a user agent string, and that string is known to correspond to only one parameter for a relevant presentation capability, that parameter may be used. However, where a particular attribute provides a less certain indication of a device's presentation capabilities, or two attributes point in different directions, heuristics may be used to determine which attribute predominates. Also, attributes may be given scores, and a capability having the highest score may be selected.

Once a particular device determination is made, one or more presentation or display parameters (where the device uses a visual display) may be identified and established as corresponding to the device (act 96). Those parameters may also be saved in case the same device or a different device in the same class later seeks to access the system. The front-end server may then receive content, such as e-mail messages, and format them according to the presentation parameters for the particular device (act 98). Finally, the system may deliver the content, such as by transmitting it to the internet as an XHTML, WML, or iMode transmission.

Figure 6:
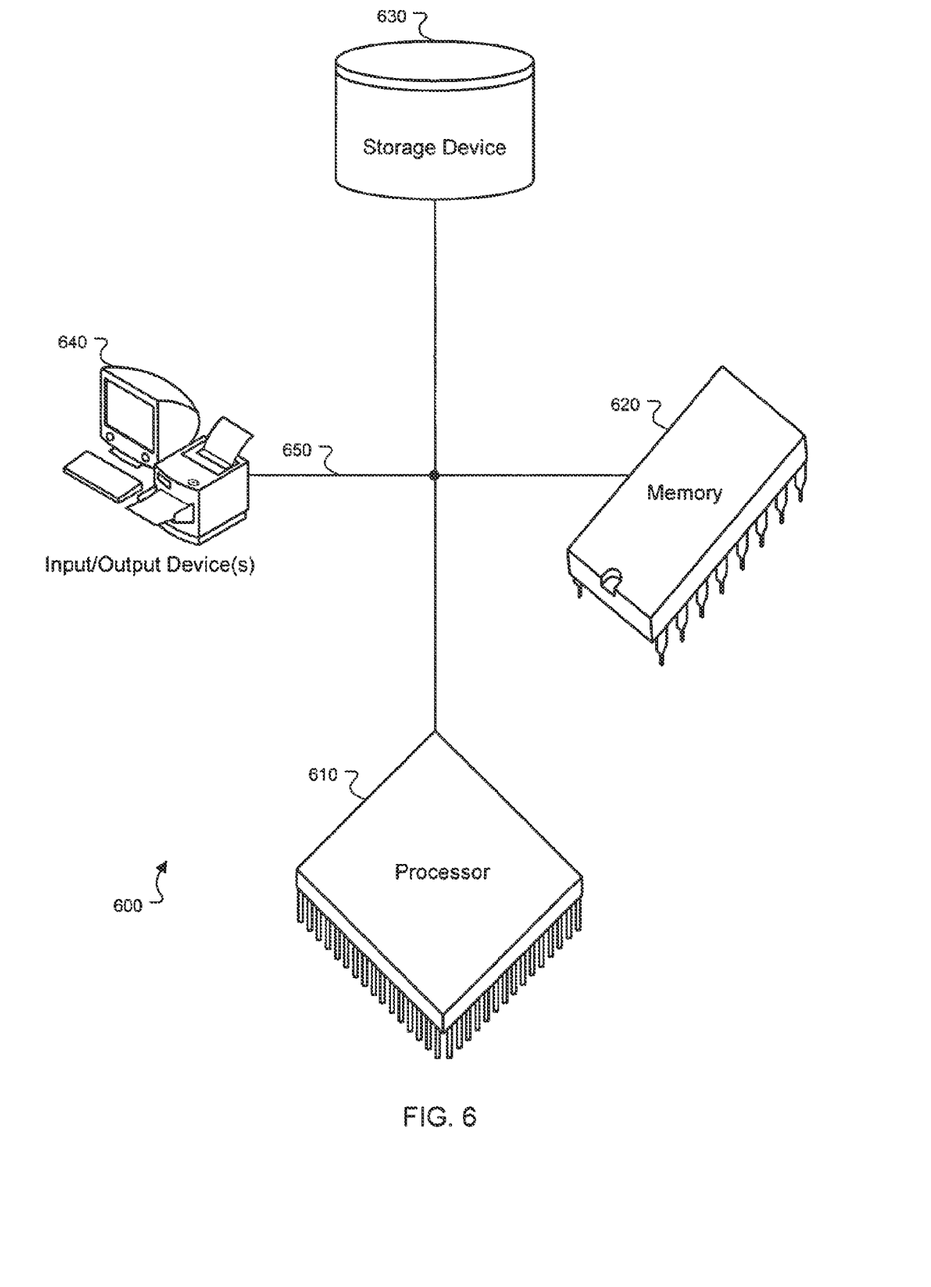
FIG. 6 is a block diagram of a computing device that may be used to implement the systems and methods described in this document.

FIG. 6 is a block diagram of a computing device 500 that may be used to implement the systems and methods described in this document, as either a client or as a server or plurality of servers. The computing device 600 includes a processor 610, a memory 620, a storage device 630, an input/output controller 640, and a network adaptor (not shown). Each of the components 610, 620, 630, 640, and 610 are interconnected using a system bus. The processor 610 is capable of processing instructions for execution within the computing device 600. The processor 610 is capable of processing instructions stored in the memory 620 or on the storage device 630 to display graphical information for a GUI on an external input/output device that is coupled to the input/output controller 640. In other implementations, multiple processors and/or multiple buses may be used, as appropriate. Also, multiple computing devices 600 may be connected, with each device providing portions of the necessary operations.

The memory 620 stores information within the computing device 600. In one, implementation, the memory 620 is a computer-readable medium. In one implementation, the memory 620 is a volatile memory unit. In another implementation, the memory 620 is a non-volatile memory unit.

The storage device 630 is capable of providing mass storage for the computing device 600. In, one implementation, the storage device 630 is a computer-readable medium. In various different implementations, the storage device 630 may be a floppy disk device, a hard disk device, an optical disk device, or a tape device, or an array of devices, including devices in a storage area network or other configuration.

In one implementation, a computer program product is tangibly embodied in an information carrier. The computer program product contains instructions that, when executed, perform one or more methods, such as those described above. The information carrier is a computer- or machine-readable medium, such as the memory 620, the storage device 630, or a propagated signal.

The input/output controller 640 manages input/output operations for the computing device 600. In one implementation, the input/output controller 640 is coupled to an external input/output device, such as a keyboard, a pointing device, or a display unit that is capable of displaying various GUI's to a user. The computing device 600 further to includes the network adaptor. The computing device 600 uses the network adaptor to communicate with other network devices.

Various implementations of the systems and techniques described here can be realized in digital electronic circuitry, integrated circuitry, specially designed ASICs (application specific integrated circuits), computer hardware, firmware, software, and/or combinations thereof. These various implementations can, include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of these implementations. For example, though much of the discussion here has focused on messaging content such as e-mails and text messages, other content such as search results, web pages, and database results may also be delivered using features described above. Accordingly, other implementations are within the scope of the following claims.

What is claimed is:

1. A server system implemented using one or more data processing devices, the server system comprising:
a communications interface configured to receive incoming requests for data;
a request processor arranged to obtain the incoming requests from the communications interface and process the incoming requests, the processing including parsing received user agent strings included in the incoming requests;
memory configured to store a plurality of predefined user agent strings and a plurality of predefined presentation capabilities of client devices that use the plurality of predefined user agent strings, the memory organized in a hierarchical arrangement that includes:
a plurality of user agent nodes that store data that characterizes the plurality of predefined user agent strings, and
a plurality of presentation capability nodes that store data that characterizes the plurality of predefined presentation capabilities of the client devices,
wherein the plurality of presentation capability nodes are superior to the plurality of user agent nodes in the hierarchical arrangement; and
a device classifier configured to receive, from the request processor, the received user agent strings and define a correlation of the received user agent strings with presentation capabilities of those of the client devices from which the incoming requests were received, the correlation based at least in part on partial matches between the received user agent strings and the plurality of predefined user agent strings characterized in the plurality of user agent nodes and traversing up the hierarchical arrangement to assign presentation capabilities characterized in those of the plurality of presentation capability nodes to the incoming requests.

2. The server system of claim 1, wherein:
the incoming requests for data are incoming requests for message data; and
the server system comprises a message delivery engine configured to deliver the message data responsive to the incoming requests, the delivered message data formatted in accordance with the presentation capabilities assigned to the incoming requests.

3. The server system of claim 2, further comprising a text-to-audio file conversion component to convert textual message data to audio files responsive to assignment of audio presentation capabilities to the incoming requests.

4. The server system of claim 2, wherein the message delivery engine is further configured to produce documents that include user interface control features responsive to the presentation capabilities assigned to the incoming requests.

5. The server system of claim 2, wherein the message delivery engine is further configured to produce documents that include icons responsive to the presentation capabilities assigned to the incoming requests.

6. The server system of claim 2, further comprising an image re-rendering component to re-render message image data responsive to assignment of the presentation capabilities to the incoming requests.

7. The server system of claim 1, wherein the device classifier is further configured to receive identifiers of communication networks from the incoming requests and define a correlation of both the communication network identifiers and the received user agent strings with the predefined presentation capabilities of the client devices from which the incoming requests were received.

8. The server system of claim 7, wherein the device classifier comprises heuristic rules for defining the correlation of the communication network identifiers and the received user agent strings with the predefined presentation capabilities of the client devices from which the incoming requests were received.

9. A server system implemented using one or more data processing devices, the server system comprising:
a communications interface configured to receive incoming requests for data;
a request processor arranged to obtain the incoming requests from the network interface and process the incoming requests, the processing including parsing user agent strings included in the incoming requests;
memory configured to store a plurality of user agent strings and a plurality of presentation capabilities of client devices that use a plurality of predefined user agent strings, the memory comprising:
data that characterizes the plurality of predefined user agent strings, and
data that characterizes the plurality of predefined presentation capabilities of the client devices, wherein the data represents the presentation capabilities in a hierarchical arrangement in which data that characterizes the plurality of predefined presentation capabilities is superior in the hierarchical arrangement to data that characterizes the plurality of predefined user agent strings; and
a device classifier configured to receive, from the request processor, the received user agent strings and identifiers of communication networks, and define a correlation of the received user agent strings and the communication network identifiers with presentation capabilities of those of the client devices from which the incoming requests were received, the correlation based at least in part on partial matches between the received user agent strings and the predefined user agent strings stored in the memory and traversing up the hierarchical arrangement to assign presentation capabilities stored in the memory to the incoming requests.

10. The server system of claim 9, wherein:
the hierarchical arrangement includes:
a plurality of user agent nodes that store the data characterizing the plurality of predefined user agent strings, and
a plurality of presentation capability nodes that store the data characterizing predefined presentation capabilities of the devices.

11. The server system of claim 9, wherein the device classifier comprises heuristic rules for defining the correlation of the communication network identifiers and the received user agent strings with the predefined presentation capabilities of the client devices from which the incoming requests were received.

12. The server system of claim 9, wherein:
the incoming requests for data are incoming requests for message data; and
the server system comprises a message delivery engine configured to deliver the message data responsive to the incoming requests, the delivered message data formatted in accordance with the presentation capabilities assigned to the incoming requests.

13. The server system of claim 12, further comprising a text-to-audio file conversion component configured to convert textual message data to audio files responsive to assignment of audio presentation capabilities to the incoming requests.

14. The server system of claim 12, wherein the message delivery engine is further configured to produce documents that include user interface control features responsive to the presentation capabilities assigned to the incoming requests.

15. The server system of claim 12, wherein the message delivery engine is further configured to produce documents that include icons responsive to the presentation capabilities assigned to the incoming requests.

16. The server system of claim 12, further comprising an image re-rendering component to re-render message image data responsive to assignment of the presentation capabilities to the incoming requests.

17. A computer-implemented method comprising:
receiving, at a system, incoming requests for data;
parsing, by the system, a plurality of user agent strings included in the incoming requests;
correlating, by the system, the plurality of received user agent strings from the incoming requests with presentation capabilities of client devices that use a plurality of predefined user agent strings and from which the incoming requests were received, the correlating including:
accessing a memory that includes a hierarchical arrangement of a plurality of user agent nodes that store data characterizing the plurality of predefined user agent strings and a plurality of presentation capability nodes that store data characterizing predefined presentation capabilities of the client devices, wherein the presentation capability nodes are superior to the user agent nodes in the hierarchical arrangement, identifying partial matches between the received user agent strings and the predefined user agent strings characterized in the user agent nodes, and traversing up the hierarchical arrangement to assign presentation capabilities characterized in those of the plurality of presentation capability nodes to the incoming requests.

18. The computer-implemented method of claim 17, wherein:

the incoming requests for data are incoming requests for message data; and the method further comprises formatting the message data responsive to the incoming requests in accordance with the presentation capabilities assigned to the incoming requests.

19. The computer-implemented method of claim 18, wherein formatting the message data comprises converting textual message data to audio files responsive to assignment of audio presentation capabilities to the incoming requests.

20. The computer-implemented method of claim 18, wherein the method further comprises producing documents that include user interface control features responsive to the presentation capabilities assigned to the incoming requests.

21. The computer-implemented method of claim 18, wherein the method further comprises producing documents that include icons responsive to the presentation capabilities assigned to the incoming requests.

22. The computer-implemented method of claim 18, wherein the method further comprises re-rendering message image data responsive to assignment of presentation capabilities to the incoming requests.

23. The computer-implemented method of claim 17, further comprising:

receiving, by the system, identifiers of communication networks from the incoming requests; and correlating both the communication network identifiers and the received user agent strings with the presentation capabilities of the client devices from which the incoming requests were received.

24. The computer-implemented method of claim 23, further comprising applying heuristic rules when correlating the communication network identifiers and the received user agent strings with the presentation capabilities of the client devices from which the incoming requests were received.

* * * * *